United States Patent [19]

Ueda et al.

[11] 4,153,822
[45] May 8, 1979

[54] TELEPHONE SET

[75] Inventors: Joji Ueda; Hisao Fukushima, both of Tokyo, Japan

[73] Assignee: Oki Electric Industry Co., Ltd., Tokyo, Japan

[21] Appl. No.: 880,468

[22] Filed: Feb. 23, 1978

[30] Foreign Application Priority Data

Mar. 8, 1977 [JP] Japan .................................. 52/244339

[51] Int. Cl.² ...................... H04M 1/03; H04M 1/06; H04M 1/50
[52] U.S. Cl. ................................. 179/103; 179/90 K; 179/100 R; 179/100 C; 179/146 R
[58] Field of Search ........... 179/100 R, 100 D, 100 C, 179/100 L, 103, 178, 179, 146 R, 147, 90 K; 325/16, 312

[56] References Cited

U.S. PATENT DOCUMENTS

| 3,167,617 | 1/1965 | Gerhardt | 179/100 D |
|---|---|---|---|
| 3,491,221 | 1/1970 | Zamarra | 179/178 |
| 3,564,164 | 2/1971 | Prescott | 179/103 |
| 4,042,793 | 8/1977 | Bellenger | 179/90 K |
| 4,126,768 | 11/1978 | Grenzow | 179/90 B |

FOREIGN PATENT DOCUMENTS

| 1201877 | 9/1965 | Fed. Rep. of Germany | 179/90 K |
|---|---|---|---|
| 1462205 | 2/1969 | Fed. Rep. of Germany | 179/90 K |
| 375812 | 6/1973 | U.S.S.R. | 179/146 R |

OTHER PUBLICATIONS

"New & Timely", Radio Electronics, Aug. 1977, p. 6.

Primary Examiner—Kathleen H. Claffy
Assistant Examiner—Randall P. Myers
Attorney, Agent, or Firm—Woodcock, Washburn, Kurtz & Mackiewicz

[57] ABSTRACT

A telephone set for use in a vehicle having a handset housing with a cramp-like shape with a transmitter microphone on one end and a receiver on the other end, and a detachable dial plate for dialing on the dorsal part of the handset housing approximately behind the receiver. Said dial plate has a groove on either side that fits in with the projection provided on the handset housing. The handset housing has a pin for securing the dial plate, which has a hole for receiving the pin. The arrangement of the pin and the hole provides plug-in facility of the dial plate in the handset. A driver of a vehicle can handle the telephone set with a single hand.

5 Claims, 14 Drawing Figures

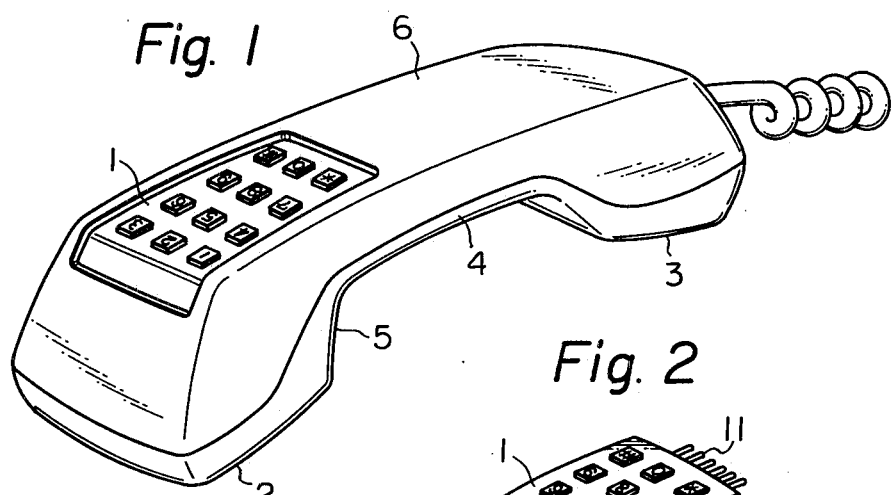
Fig. 1
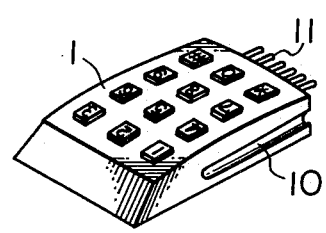
Fig. 2
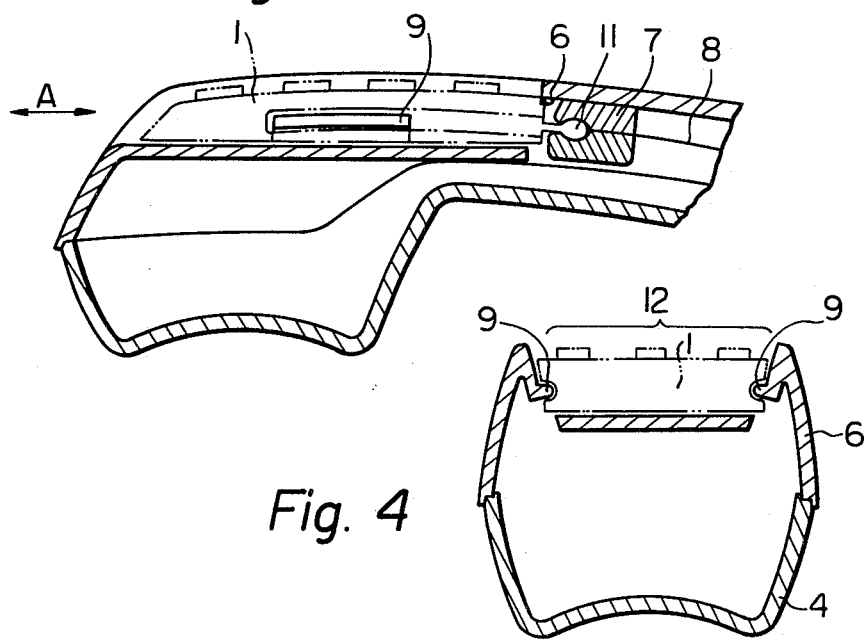
Fig. 3
Fig. 4

TELEPHONE SET

BACKGROUND OF THE INVENTION

The present invention relates to the structure of a telephone set, in particular, relates to a telephone set suitable for use in automobiles.

Conventional telephone sets have a structure comprising a base housing (the upper housing or the lower housing), with a dial screwed thereon, and a cover housing. Therefore, fabrication of a telephone set requires many assembling processes. If a dial is to be replaced with another type of dial, the handset housing must be dismantled. Also, because the dial is mounted on the abdominal side of the handset, it is hidden underneath and not operable when the handset is rested on the cradle.

In operation, if the handset is held in one hand and if a finger of the same hand is to be used for dialing, maintaining a firm grip on the handset is extremely difficult. This shortcoming during operation becomes a major drawback particularly at the time of operating a car telephone while driving.

SUMMARY OF THE INVENTION

It is an object, therefore, of the present invention to overcome the disadvantages and limitations of prior telephone sets by providing a new and improved telephone set. Another object of the present invention is to provide a telephone set which enables operation of the dial with a finger of the hand holding the handset, and having an easily replaceable dial.

The above and other objects are attained by a telephone set comprising a handset with a cramp-like shape with a transmitter microphone on one end and receiver on the other end, and a plug-in type detachable push-button type dial on the dorsal part of the handset housing approximately behind the receiver.

BRIEF DESCRIPTION OF THE DRAWINGS

The foregoing and other objects, features and attendant advantages of the present invention will be appreciated as the same become better understood by means of the following description and accompanying drawings wherein;

FIG. 1 is a perspective view of the external appearance of the telephone set according to the present invention;

FIG. 2 is the external appearance of the dial plate;

FIG. 3 illustrates the essential part of the longitudinal section of the handset bisected lengthwise;

FIG. 4 is a cross section of the guide projection of the present telephone set;

DESCRIPTION OF THE PREFERRED EMBODIMENTS

The embodiments of the present invention will be explained below, referring to the attached drawings.

FIGS. 1 through 8 indicate the configuration of the telephone set as well as structural examples according to the present invention.

Figure 5:
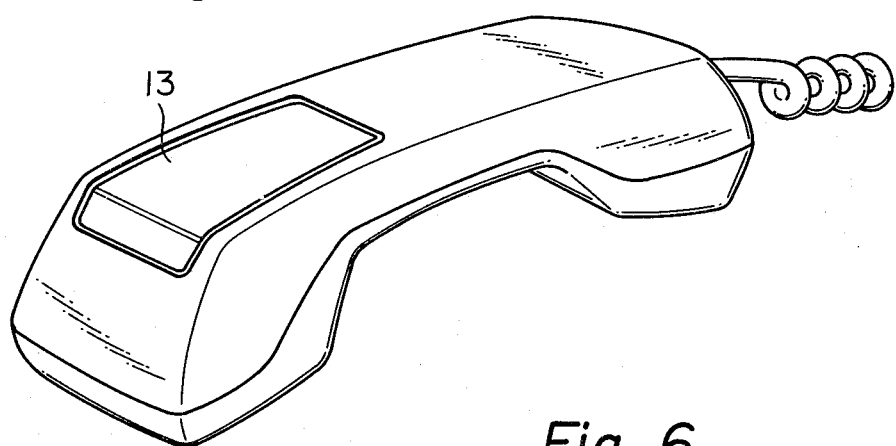
FIG. 5 shows the blind plate inserted after the dial plate shown in FIG. 1 has been removed.
Figure 6:
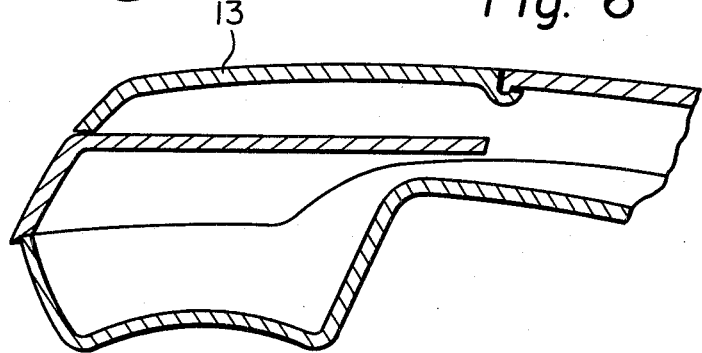
FIG. 6 is the longitudinal cross section of the part of the telephone set shown in FIG. 5.
Figure 7:
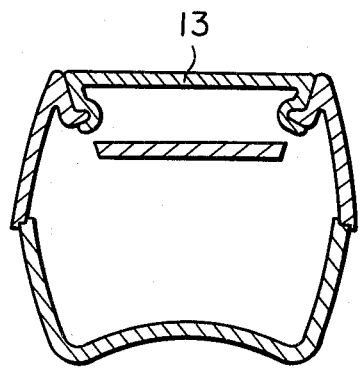
FIG. 7 is the cross section of the telephone set shown in FIG. 5.
Figure 8:
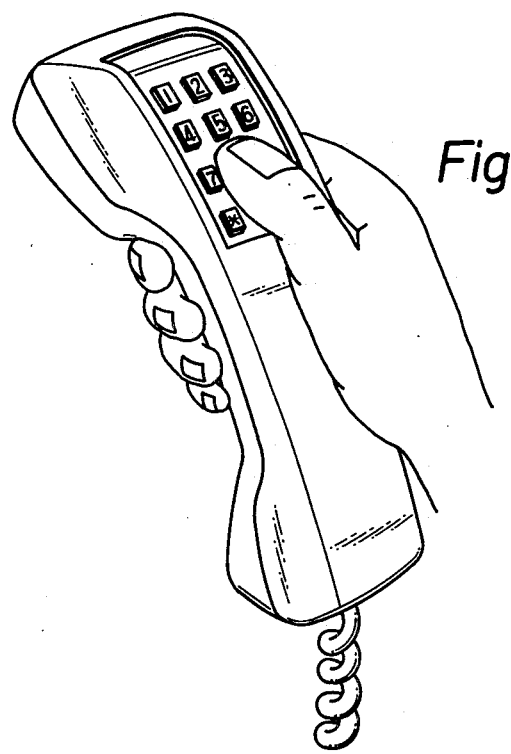
FIG. 8 depicts the dialing operation of the present telephone set shown in FIG. 1.

FIG. 1 shows the perspective view of the external features of the telephone set with a cramp-like congfiguration. FIG. 2 gives external features of the dial plate. FIG. 3 depicts an essential part of the longitudinal section of the handset bisected lengthwise. FIG. 4 is cross section of the guide projection on the handset housing for insertion of the dial plate. FIG. 5 depicts the blind cover fitted after detaching the dial plate shown in FIG. 1. FIGS. 6 and 7 give longitudinal and cross sectional views respectively, of FIG. 5. FIG. 8 shows an example of the dial operation of the telephone set according to the present invention.

Throughout those figures, the reference numeral 1 is a dial plate, 2 is a receiver, 3 is a transmitter microphone, 4 is a lower housing (abdominal part of the handset), 5 is a jaw (base of the receiver), 6 is an upper housing (dorsal side of the handset), 7 is a plug, 8 is terminals and wires, 9 is a guide projection for accommodating the dial plate, 10 is a groove for inserting the dial plate along the guide projection, 11 is a dial plate terminal, 12 is a dial plate seat, 13 is a blind cover.

The upper housing 6 is provide with the guide projections 9 (for insertion of the dial plate) on the interior wall of the seat 12 (for setting the dial plate), and is also provided with the plug 7 which receives the dial plate terminals 11.

The lower housing 4 and the upper housing 6 are combined to complete a handset housing. The dial plate 1 is provided with the dial plate terminals 11 and with the groove 10 which fits with the projection of the handset. On the surface of the dial plate is mounted either a rotary type dial or a push-button type dial although a push-button type dial is embodied in the drawing.

For mounting the dial plate on the handset housing or detaching it therefrom, the dial plate is slid in the direction of the arrow A indicated in FIG. 3, along the guide groove 10 through which the guide groove 10 through which the guide projection 9 slides. The terminals 11 are plugged into the plugs 7

When the dial plate is not mounted on the housing, a blind cover 13 covers the dial plate seat.

One of the features of the present invention is that the dial plate 1 is mounted on the upper housing 6, i.e. on the dorsal part of the handset, and preferably approximately behind the receiver. Thus, as shown in FIG. 8, the handset can be held in a single hand, placing the fingers (forefinger or middle finger) at the base (the jaw) of the receiver of the handset and operating the push buttons with the thumb of the same hand. That is, one hand will both hold and handset and operate the push buttons at the same time. Because the dial plate is readily detachable, dial plates of different designs of rotary type dials can be chosen according to the use's taste.

Figure 10:
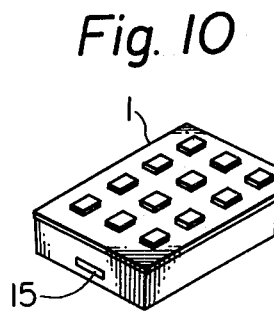
FIG. 10 illustrates another configuration of the dial plate for mounting on the type of the telephone set shown in FIG. 9.
Figure 9:
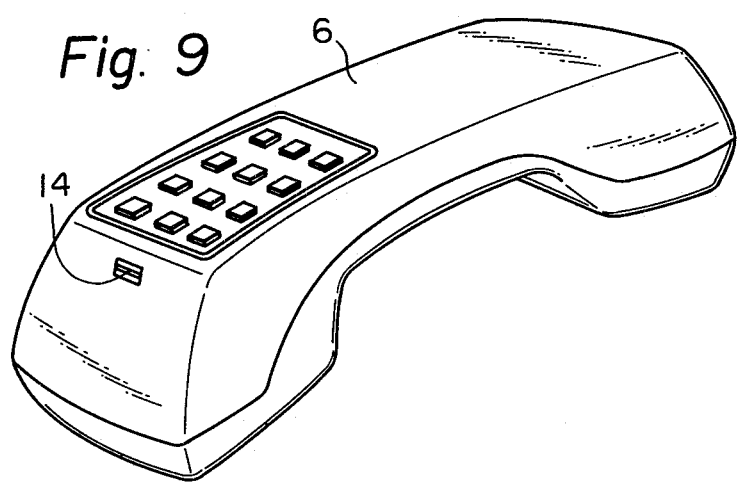
FIG. 9 is another configuration of the telephone set according to the present invention.
Figure 11:
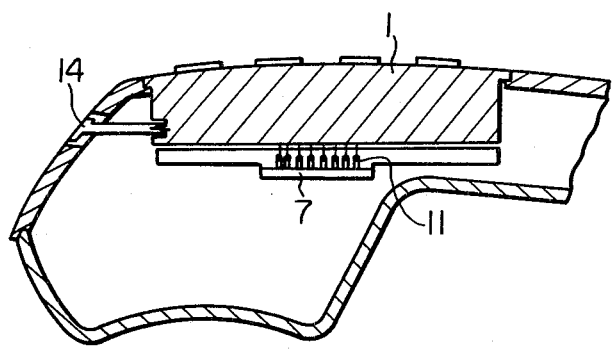
FIG. 11 illustrates the essential part of the longitudinal section of the handest shown in FIG. 9.

FIGS. 9, 10 and 11 illustrate the another configuration of the telephone set according to the present invention. The upper housing 6 is provided with a pin 14 (prong) for mounting the dial plate. And the dial plate 1 is provided with a hole 15 arranged to fit the pin 14, when the dial plate is mounted on the upper housing the pin and the hole fit exactly and the dial plate is fixed. In this embodiment, the dial plate terminals 11 and plugs 7 are provided on the rear of the dial plate as illustrated in FIG. 11.

Figure 12:
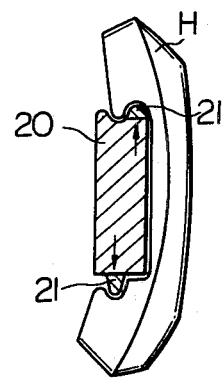
FIG. 12 illustrates the handset used as a wall telephone.

FIG. 12 illustrates a cradle to be fixed on the wall on which the handset H is rested. The cradle 20 is provided with a spring loaded projection 21 on the upper and the lower depressions of the cradle. These spring projections fit the jaws (the base of the receiver and the base of the transmitter microphone) of the handset providing a stable rest to the handset.

Figure 13A:
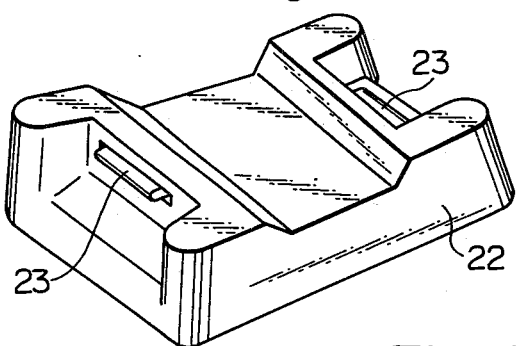
FIG. 13(A) and FIG. 13(B) show a configuration of the cradle providing a stable rest to the handset.
Figure 13B:
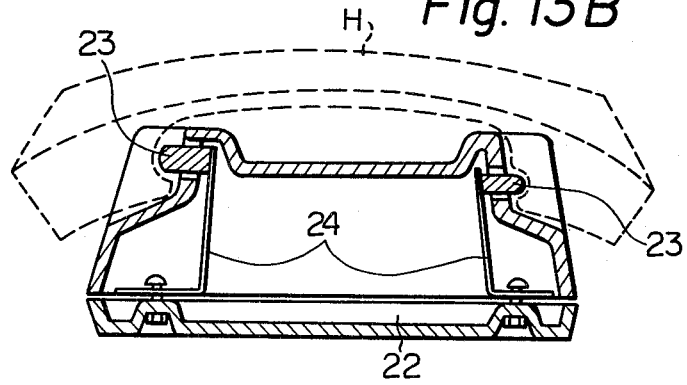

FIGS. 13(A) and 13(B) illustrate a configuration in a situation where the handset H is to be placed on the cradle 22 on a desk, provided with sheet spring 24 with the projections 23 at the ends. These spring projections 23 fit the jaws (the base of the receiver and the base of the transmitter microphone) of the handset H providing a stable rest to the handset.

As explained in detail, the telephone set according to the present invention is provided with a detachable dial plate mounted on the dorsal part of the handset and offers the following advantages;

(1) In manufacturing telephones with different types of dial plates, all the components can be of common designs except for the dial plate which must be specified. This facilitates supply of components, fabrication, and repair.

(2) Since the dial plate is readily replaceable, users may enjoy selecting fashionable dial plates of different designs.

(3) The handset can be held and operated with a single hand. This is particularly important in a telephone set whereby dialing while driving becomes possible.

From the foregoing it will now be apparent that a new and improved telephone set has been found. It should be understood of course that the embodiments disclosed are merely illustrative and are not intended to limit the scope of the invention. Reference should be made to the appended claims, therefore, rather than the specification as indicating the scope of the invention.

Finally, the reference numerals and symbols referred to in this specification are listed below;

1: dial plate
2: receiver
3: transmitter microphone
4: lower housing
5: Jaw (base of the receiver)
6: upper housing
7: plug
8: terminal and wire
9: guide projection
10: groove
11: dial plate terminal
12: dial plate seat
13: blind cover
14: pin (prong) for mounting the dial plate
15: hole arranged to fit the pin (prong)
20: cradle
21: spring projection
22: cradle

What is claimed is:

1. A telephone set comprising a handset housing with a cramp-shape configuration with a transmitter microphone on one end and a receiver on the other end and a detachable plug-in push button type dial for dialing plugged in and slidably mounted on the dorsal part of the handset housing approximately behind the receiver, said handset having a pair of guide projections and said dial having a pair of grooves positioned to fit with said guide projections.

2. A telephone set comprising a handset housing of a cramp-shape configuration with a transmitter microphone on one end and a receiver on the other end, said handset housing having spaced guide projections on its dorsal side, a detachable rectangular plug-in push button type dial plugged into the dorsal part of the handset housing, said push button type dial having a linear groove on each side, which grooves fit in with said guide projections, said handset housing having a pin for securing said push button type dial, said dial having a hole which engages with said pin.

3. A telephone set according to claim 2, wherein said push button type dial has terminals at its rear surface for electrical connection to said handset housing.

4. A telephone set according to claim 2, wherein said handset housing has a pair of jaws at the inner sides of the microphone and the receiver, and said jaws fit with a pair of spring loaded projections of a cradle installed on a wall.

5. A telephone set according to claim 2, wherein said handset housing has a pair of jaws at the inner sides of the microphone and the receiver, and said jaws fit with a pair of projections mounted on sheet springs of a cradle on a desk.

* * * * *